US008736598B2

(12) United States Patent
Lee

(10) Patent No.: US 8,736,598 B2

(45) Date of Patent: May 27, 2014

(54) ELECTROPHORESIS DISPLAY APPPARATUS AND POWER CONTROL METHOD THEREOF

(75) Inventor: Sunghoon Lee, Gumi-si (KR)

(73) Assignee: LG Display Co., Ltd., Seoul (KR)

(*) Notice: Subject to any disclaimer, the term of this patent is extended or adjusted under 35 U.S.C. 154(b) by 167 days.

(21) Appl. No.: 13/275,838

(22) Filed: Oct. 18, 2011

(65) Prior Publication Data

US 2012/0113082 A1 May 10, 2012

(30) Foreign Application Priority Data

Nov. 9, 2010 (KR) ........................ 10-2010-0111100

(51) Int. Cl.
*G06F 3/08* (2006.01)

(52) U.S. Cl.
USPC ................ 345/214; 345/107; 345/87; 345/89

(58) Field of Classification Search
None
See application file for complete search history.

(56) References Cited

U.S. PATENT DOCUMENTS

2009/0027322 A1* 1/2009 Hosotani ......................... 345/87
2009/0115772 A1* 5/2009 Shiomi et al. ................. 345/214
2010/0309193 A1* 12/2010 Sun et al. ...................... 345/214

FOREIGN PATENT DOCUMENTS

CN 101241677 A 8/2008
CN 101751865 A 6/2010

OTHER PUBLICATIONS

Office Action issued in corresponding Chinese Patent Application No. 201110351252.5, mailed Dec. 4, 2013, 16 pages.

* cited by examiner

*Primary Examiner* — Van Chow
(74) *Attorney, Agent, or Firm* — Brinks, Gilson & Lione

(57) ABSTRACT

An electrophoresis display apparatus is provided comprising a display panel comprising data lines and gate lines crossing the data lines, a data driving circuit generating data voltages selected among a positive voltage, a negative voltage, and a ground voltage during an image update period and supplying the data voltages to the data lines, a gate driving circuit supplying gate pulses to the gate lines in synchronization with the data voltages during the image update period, and a control logic circuit blocking an output of the data driving circuit based on a variation in one of the positive voltage and a logic power voltage immediately after the image update period, wherein the logic power voltage is lower than the positive voltage and higher than the ground voltage and wherein the ground voltage is lower than the logic power voltage and higher than the negative voltage.

11 Claims, 9 Drawing Sheets

| Condition | Control |
|---|---|
| Vpos > Vcc | Normal OUTPUT |
| Vpos ≤ Vcc | Cut off output of Vpos and Vneg |
| Vcc > Vint | Normal OUTPUT |
| Vcc ≤ Vint | Cut off output of Vpos and Vneg |

ELECTROPHORESIS DISPLAY APPPARATUS AND POWER CONTROL METHOD THEREOF

This application claims the benefit of Korea Patent Application No. 10-2010-0111100 filed on Nov. 9, 2011, the entire contents of which is incorporated herein by reference in its entirety for all purposes as if fully set forth herein.

BACKGROUND

1. Field of the Invention

The embodiments of this document are directed to an electrophoresis display apparatus and a method of controlling power for the electrophoresis display apparatus.

2. Discussion of the Related Art

When subjected to an electric field, an electrically charged material initiates movement of its molecules according to electric charges and size and shape of the molecules. This phenomenon is called "electrophoresis". Recently, display apparatuses are being developed using the electrophoresis and draw attention as an alternative to existing paper media or conventional display elements.

Electrophoresis display-related inventions are disclosed in U.S. Pat. Nos. 7,012,6000 and 7,119,772. An electrophoresis display apparatus includes data lines, gate lines (or scan lines) crossing the data lines, and an electrophoretic film. As used for a data driving circuit, source drive ICs (also simply referred to as "ICs") supply data voltages to the data lines. Gate drive ICs used for a gate driving circuit sequentially supply gate pulses (or scan pulses) swinging between a gate high voltage and a gate low voltage to the gate lines.

The source drive ICs may be mounted on a flexible, transparent substrate. As irradiated onto the substrate with the source drive ICs mounted on, external light is incident onto the source drive ICs via the substrate, so that gate voltages are created at gates of transistors embedded in the source drive ICs. When external light is irradiated onto channels of the transistors, leakage currents may occur from the transistors. As a consequence, an unwanted voltage may be output from the source drive ICs after image update. Resultantly, if the source drive ICs are illuminated with external light after an image is updated on pixels of the electrophoresis display apparatus, pixel voltages are changed, thus resulting in a deterioration of image quality.

BRIEF SUMMARY

Exemplary embodiments of this document provide an electrophoresis display apparatus and a power control method for the electrophoresis display apparatus, which can prevent an abnormal output of the source drive ICs after image update.

According to an embodiment, there is provided an electrophoresis display apparatus comprising a display panel comprising data lines and gate lines crossing the data lines, a data driving circuit generating data voltages selected among a positive voltage, a negative voltage, and a ground voltage during an image update period and supplying the data voltages to the data lines, a gate driving circuit supplying gate pulses to the gate lines in synchronization with the data voltages during the image update period, and a control logic circuit blocking an output of the data driving circuit based on a variation in one of the positive voltage and a logic power voltage immediately after the image update period, wherein the logic power voltage is lower than the positive voltage and higher than the ground voltage and wherein the ground voltage is lower than the logic power voltage and higher than the negative voltage.

BRIEF DESCRIPTION OF THE DRAWINGS

The accompanying drawings, which are included to provide a further understanding of the embodiments and are incorporated in and constitute a part of this specification, illustrate embodiments and together with the description serve to explain the principles of the embodiments. In the drawings.

DETAILED DESCRIPTION OF THE DRAWINGS AND THE PRESENTLY PREFERRED EMBODIMENTS

Figure 1:
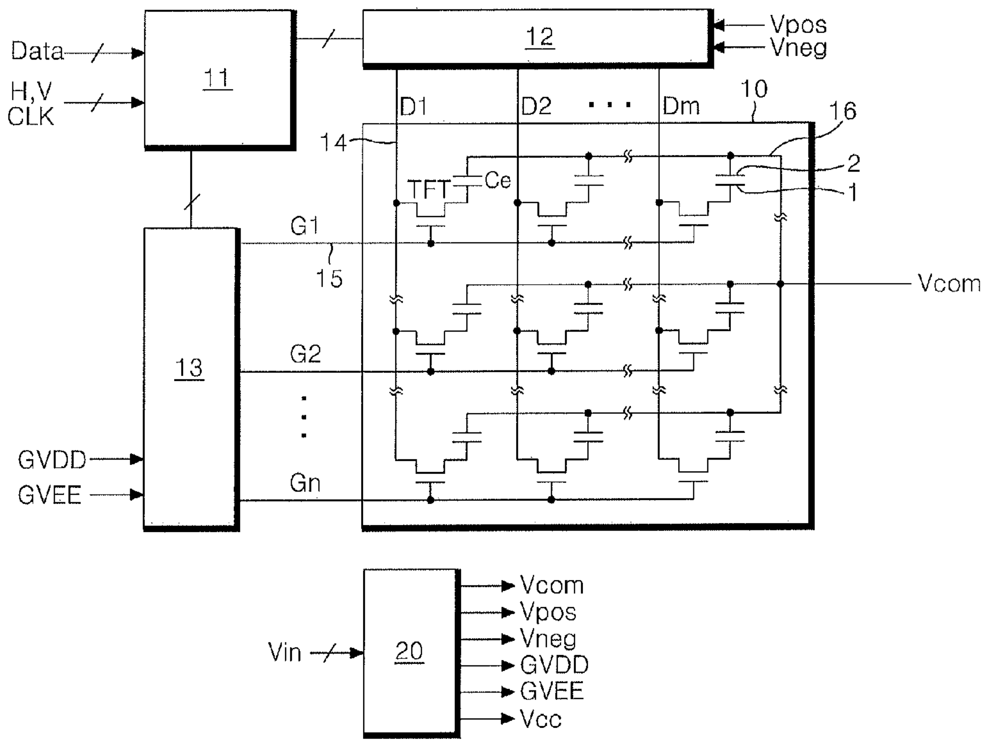
FIG. 1 is a block diagram illustrating an electrophoresis display apparatus according to an embodiment.

Hereinafter, exemplary embodiments of this document will be described in greater detail with reference to the accompanying drawings, wherein the same reference numerals may be used to denote the same or substantially the same elements throughout the specification and the drawings. Detailed description on well known functions or configurations deemed to make the gist of this document unclear will be omitted.

Figure 2:
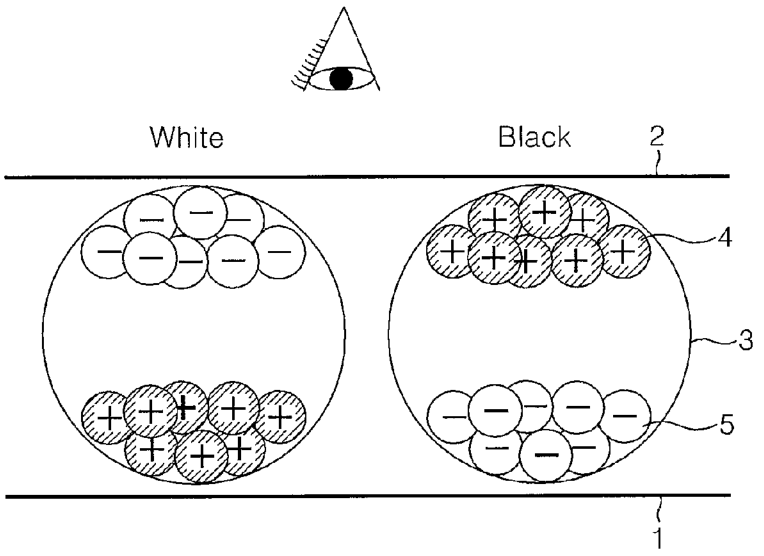
FIG. 2 is a view illustrating in detail a microcapsule structure in the pixel shown in FIG. 1.

FIG. 1 is a block diagram illustrating an electrophoresis display apparatus according to an embodiment. FIG. 2 is a view illustrating in detail a microcapsule structure in the pixel shown in FIG. 1.

Referring to FIGS. 1 and 2, an electrophoresis display apparatus according to an embodiment includes a display panel 10 having pixels Ce arranged in a matrix pattern, a data driving circuit 12 supplying data voltages to data lines 14 of the display panel 10, a gate driving circuit 13 supplying scan pulses to gate lines 15 of the display panel 10, a controller 11 controlling the driving circuits 12 and 13, and a power circuit 20.

The display panel 10 includes a plurality of microcapsules 3 between a common electrode 2 and a pixel electrode 1 as shown in FIG. 2. The common electrode 2 is formed of a transparent material, such as ITO (Indium Tin Oxide). Each microcapsule 3 includes white particles 5 negatively charged and black particles 4 positively charged.

The data lines 14 intersect the gate lines 15 on a lower substrate of the display panel 10. The lower substrate is formed of glass, metal, or plastic film. Thin film transistors (TFTs) are provided at intersections of the data and gate lines 14 and 15. Source electrodes of the TFTs are connected to the data lines 14, and drain electrodes of the TFTs are connected to pixel electrodes 1 of pixels Ce. When a positive voltage Vpos is applied to a pixel electrode 1 of a pixel Ce, the pixel Ce displays a black grayscale, and when a negative data voltage is applied to the pixel electrode 1 of the pixel Ce, the pixel Ce displays a white grayscale. Data are newly written to the pixels Ce during image update. After the image update, the pixels Ce maintain the grayscales of the currently written data until next update is done.

Gate electrodes of the TFTs are connected to the gate lines 15. In response to scan pulses from the gate lines 15, the TFTs are turned on to select a line of pixels Ce to perform display and supply the data voltages from the data lines 14 to the pixel electrodes 1 of the selected pixels Ce. A common electrode line 16 is formed on an upper transparent substrate of the display panel 10 to simultaneously supply a common voltage Vcom to all of the pixels. The upper substrate is formed of glass or plastic film.

Figure 7:
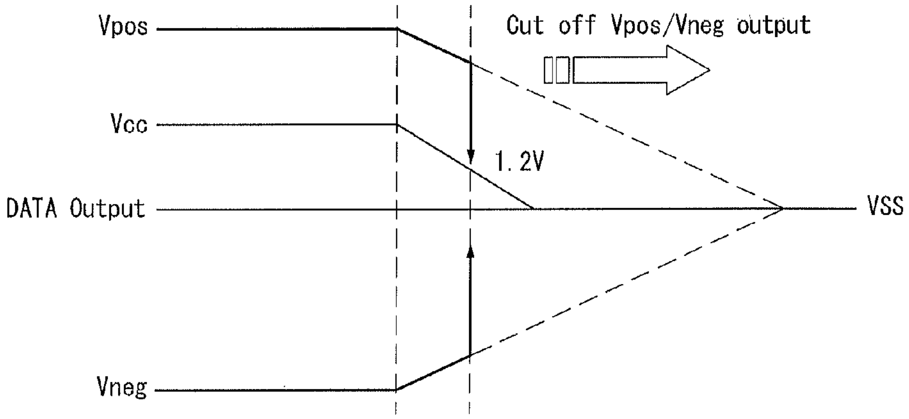
FIG. 7 is a waveform diagram illustrating an exemplary power off sequence.
Figures 8, 9:
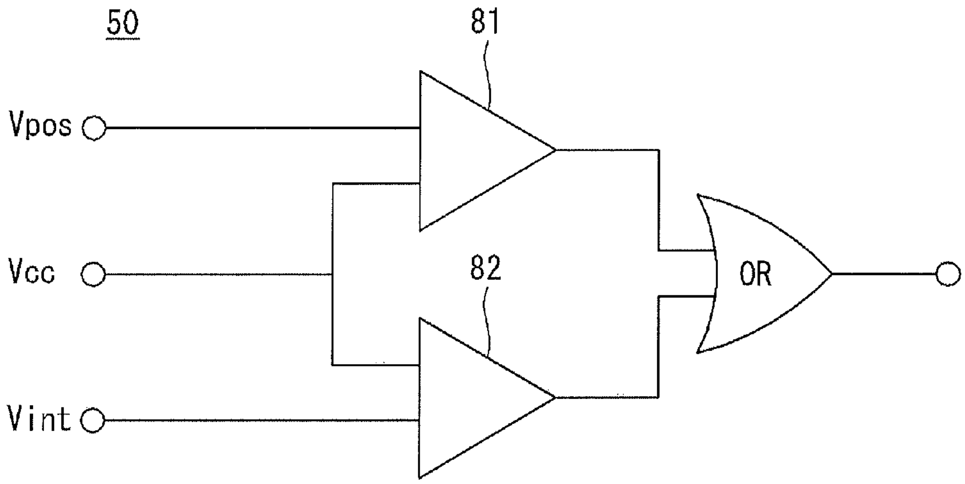
FIG. 8 is a circuit diagram illustrating in detail the control logic circuit 50 shown in FIG. 5.
FIG. 9 is a view illustrating a power off operation of the control logic circuit 50 shown in FIG. 5.

The data driving circuit 12 includes a plurality of source drive ICs that output any one of a positive voltage Vpos, a negative voltage Vneg, and a ground voltage Vss using transistors and the level shifter as shown in FIGS. 7 and 8. The source drive IC outputs a positive voltage Vpos=+15V when digital data input from the controller 11 is '012' during image update, and outputs a negative data voltage Vneg=−15V when the digital data input from the controller 11 is '102' during image update. Further, the source drive IC outputs a ground voltage Vss=0V when the digital data input from the controller 11 is '002' or '112' during image update. Accordingly, during the course of image update, the source drive IC selects any one of three phase voltages Vpos, Vneg, and Vss as a data voltage in response to the digital data input from the controller 11 and outputs the selected voltage to a corresponding data line 14. The voltage output from the source drive IC is supplied to the pixel electrode 1 of the pixel Ce via the data line 14 and the TFT.

The gate driving circuit 13 includes a plurality of gate drive ICs. The gate drive ICs include a shift register, a level shifter for converting a swing width of an output signal from the shift register to a swing width appropriate for driving the TFT, and an output buffer connected between the level shifter and the gate line 15. The gate driving circuit 13 sequentially outputs scan pulses in synchronization with data voltages supplied to the data lines 14 during image update. The scan pulses swing between a positive gate voltage GVDD and a negative gate voltage GVEE.

The controller 11 receives horizontal/vertical sync signals V and H and a main clock signal CLK to generate control signals for controlling operation timing of the driving circuits 12 and 13. The control signals include a source timing control signal for controlling operation timing of the data driving circuit 12, and a gate timing control signal for controlling operation timing of the gate driving circuit 13. The controller 11 supplies digital data set for each data grayscale to the source drive ICs according to a current grayscale status of the pixels and a next status of to-be-updated pixels using a lookup table having waveforms of the data voltages set therein and a frame memory storing input images.

The power circuit 20 generates driving voltages Vcc, Vcom, Vpos, Vneg, GVDD, and GVEE using a DC-DC converter driven in response to an input voltage Vin input when a power supply of the electrophoresis display apparatus is turned on. The logic power voltage Vcc is a logic voltage necessary for driving an application specific integrated circuit (ASIC) of the controller 11, the source drive ICs of the data driving circuit 12, and the gate drive ICs of the gate driving circuit 13, and is, for example, a 3.3V DC voltage. The positive data voltage Vpos is, for example, a +15V DC voltage, and the negative voltage Vneg is, for example, a −15V DC voltage. The common voltage Vcom is, for example, a DC voltage between 0V and −2V. The negative gate voltage GVEE is, for example, a −20V DC voltage. The positive gate voltage is, for example, a +22V DC voltage.

Figure 3:
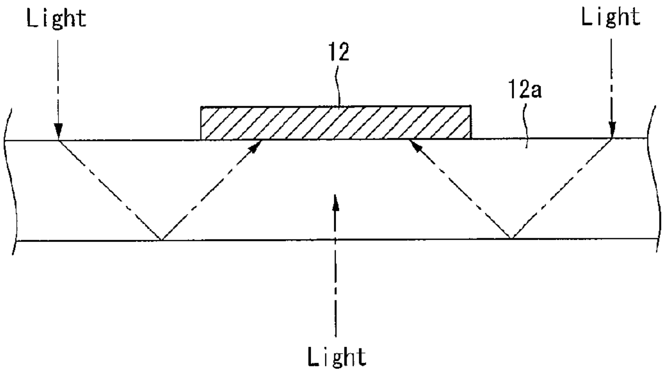
FIG. 3 is a view illustrating an example where when a source drive IC is mounted on a COF substrate, external light is irradiated onto the source drive IC through the COF substrate.

The source drive IC of the data driving circuit 12 is mounted on a COF (Chip On Film) 12*a* as shown in FIG. 3. When the COF 12*a* is illuminated with external light, light beams are incident onto channels of transistors embedded in the source drive IC through the bottom surface of the source drive IC and the substrate of the COF. As a consequence, leakage currents are created from the transistors.

To update the image on the display panel 10, any known methods can apply. After the image update, the data driving circuit 12 does not create any output not to affect the pixels Ce. The source drive IC of the data driving circuit 12 includes a level shifter. Although an input voltage of the level shifter in the source drive IC is turned off immediately after image update, an abnormal output may be generated from the level shifter right after the image update due to remaining charges in the level shifter. The output of the level shifter is applied to the transistors in the source drive IC.

As an undesired voltage is output from the level shifter after image update and the voltages of the source drive IC, which includes Vpos, Vneg, and Vss, are not completely turned off, when external light is incident onto the transistors in the source drive IC, the transistors instantly raise the voltages of the output terminals of the source drive IC.

Figure 4:
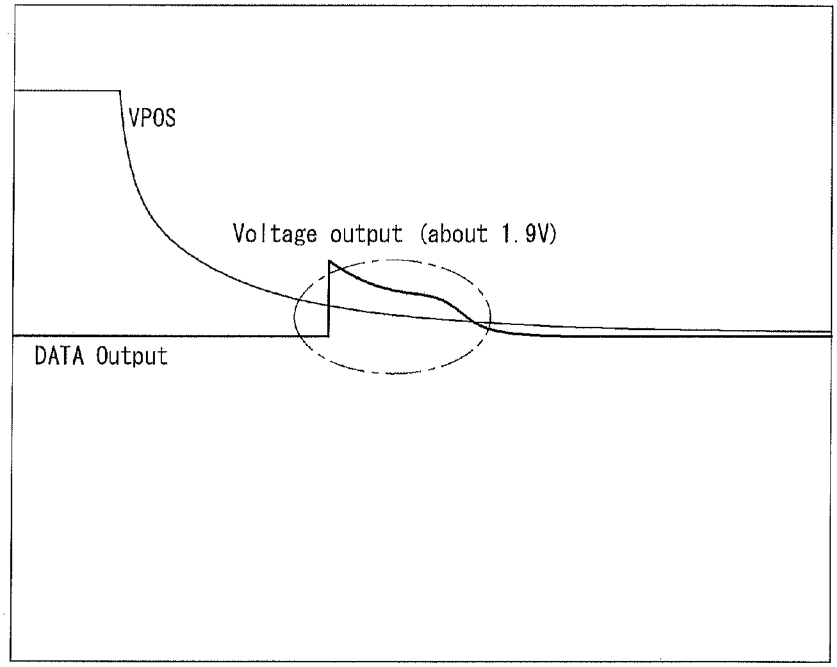
FIG. 4 is a view illustrating a test result of measuring a data output of a source drive IC by illuminating the source drive IC with external light.

FIG. 4 illustrates a test result of measuring a data output of a source drive IC by illuminating the source drive IC with external light. Immediately after image update, the positive voltage Vpos and negative voltage Vneg are lowered down to OV according to a predetermined power off sequence as shown in FIG. 4. Although the positive voltage Vpos is decreased immediately after the image update, when the positive voltage Vpos is higher than 0V, an abnormal output is created from the level shifter, and as external light is irradiated onto the source drive IC, leakage currents flow through channels of the transistors of the source drive IC, so that the output of the source drive IC is lifted up to about 1.9V as shown in FIG. 4, thereby negatively affecting image quality.

Figure 5:
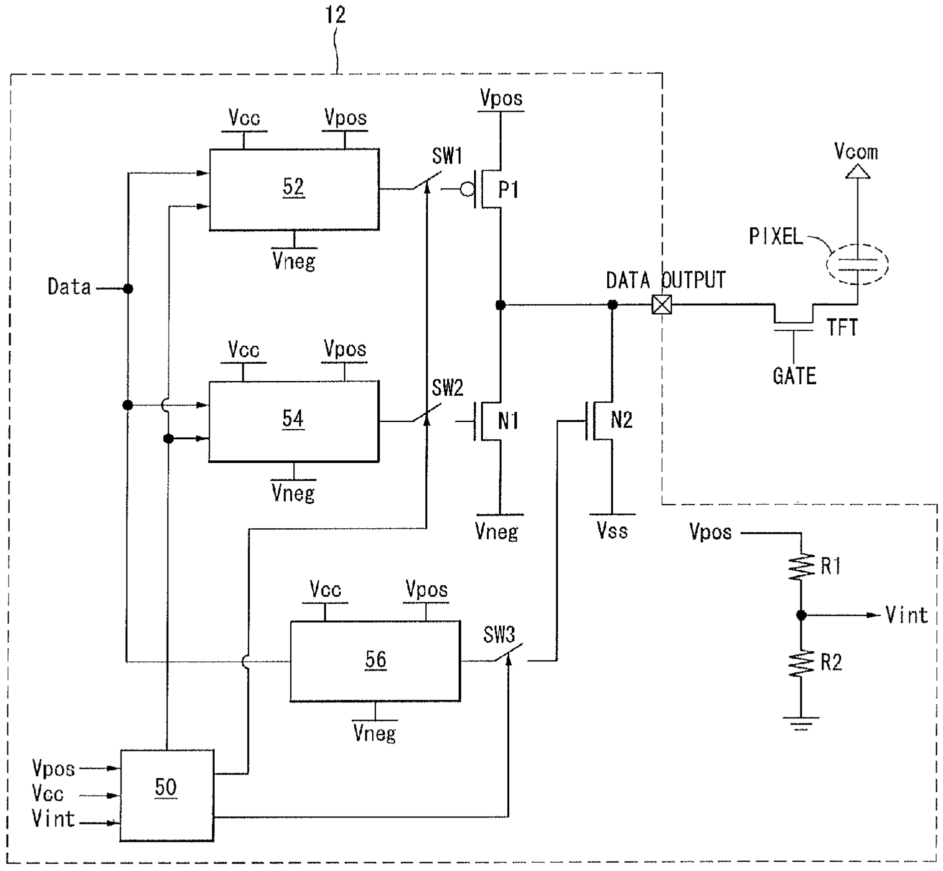
FIG. 5 is a circuit diagram illustrating a source drive IC according to an embodiment.

An embodiment of this document swiftly blocks a current path between the level shifter and transistors in the source drive IC immediately after image update using a control logic as shown in FIGS. 5 and 7.

FIG. 5 is a circuit diagram illustrating a source drive IC according to an embodiment.

Referring to FIG. 5, a source drive IC of the data driving circuit 12 includes first to third level shifters 52, 54, and 56, first to third transistors P1, N1, and N2, first to third switches SW1, SW2, and SW3, a control logic circuit 50, and an internal voltage generating circuit.

The first level shifter 52 outputs a negative voltage Vneg when digital data input from the controller 11 is '012' during image update. The first switch SW1 is connected between an output terminal of the first level shifter 52 and the gate electrode of the second transistor P1. The first switch SW1 turns on/off a current path between the output terminal of the first level shifter 52 and the gate electrode of the second transistor P1 under control of the control logic circuit 50. The first switch SW1 forms a current path between the output terminal of the first level shifter 52 and the gate electrode of the first transistor P1 during image update. The first switch SW1 blocks a current path between the output terminal of the first level shifter 52 and the gate electrode of the first transistor P1 immediately after image update. The first switch SW1 may be implemented as a MOSFET (Metal Oxide Semiconductor Field Effect Transistor).

The first transistor P1 is implemented as a p-type MOSFET. The gate electrode of the first transistor P1 is connected to the first switch SW1, and the drain electrode thereof is connected to the output terminal of the source drive IC. The positive voltage Vpos is supplied to the source electrode of the first transistor P1.

During the course of image update, during which the first switch SW1 maintains an ON state, the first transistor P1 is turned on according to the negative voltage Vneg input from the first level shifter 52 to supply the positive voltage Vpos to the data line 14 through the output terminal of the source drive IC. In contrast, immediately after the image update during which the first switch SW1 is turned off, the gate electrode of the first transistor P1 is floated, so that the first transistor P1 is turned off. While the gate electrode of the first transistor P1 is floated, even when external light is irradiated onto the channel of the first transistor P1, no or little leakage current is generated at the channel. Accordingly, no or little voltage is supplied to the output terminal of the source drive IC through the first transistor P1 right after the image update.

The second level shifter 54 outputs the positive voltage Vpos when digital data input from the controller 11 is '102' during image update. The second switch SW2 is connected between the output terminal of the second level shifter 54 and the gate electrode of the second transistor N1. Under control of the control logic circuit 50, the second switch SW2 turns on/off a current path between the output terminal of the second level shifter 54 and the gate electrode of the second transistor N1. The second switch SW2 forms a current path between the output terminal of the second level shifter 54 and the gate electrode of the second transistor N1 during image update. Immediately after the image update, the second switch SW2 blocks the current path between the output terminal of the second level shifter 54 and the gate electrode of the second transistor N1. The second switch SW2 may be implemented as a MOSFET.

The second transistor N1 is implemented as an n-type MOSFET. The gate electrode of the second transistor N1 is connected to the second switch SW2, and the drain electrode thereof is connected to the output terminal of the source drive IC. The source electrode of the second transistor N1 is supplied with the negative voltage Vneg.

During the course of image update, during which the second switch SW2 maintains an ON state, the second transistor N1 is turned on according to the positive voltage Vpos input from the second level shifter 54 to supply the negative voltage Vneg to the data line 14 through the output terminal of the source drive IC. In contrast, immediately after the image update during which the second switch SW2 is turned off, the gate electrode of the second transistor N1 is floated, so that the second transistor N1 is turned off. While the gate electrode of the second transistor N1 is floated, even when external light is irradiated onto the channel of the second transistor N1, no or little leakage current is generated at the channel. Accordingly, no or little voltage is supplied to the output terminal of the source drive IC through the second transistor N1 right after the image update.

The third level shifter 56 outputs a positive voltage Vpos when digital data input from the controller 11 is '002' or '112' during image update. The third switch SW3 is connected between an output terminal of the third level shifter 56 and the gate electrode of the third transistor N2. The third switch SW3 turns on/off a current path between the output terminal of the third level shifter 56 and the gate electrode of the third transistor N2 under control of the control logic circuit 50. The third switch SW3 forms a current path between the output terminal of the third level shifter 56 and the gate electrode of the third transistor N2 during image update. The third switch SW3 blocks the current path between the output terminal of the third level shifter 56 and the gate electrode of the third transistor N2 immediately after image update. The third switch SW3 may be implemented as a MOSFET.

The third transistor N2 is implemented as an n-type MOSFET. The gate electrode of the third transistor N2 is connected to the third switch SW3, and the drain electrode thereof is connected to the output terminal of the source drive IC. The source electrode of the third transistor N2 is supplied with the ground voltage Vss.

During the course of image update, during which the third switch SW3 maintains an ON state, the third transistor N2 is turned on according to the positive voltage Vpos input from the third level shifter 56 to supply the ground voltage Vss to the data line 14 through the output terminal of the source drive IC. In contrast, immediately after the image update during which the third switch SW3 is turned off, the gate electrode of the third transistor N2 is floated, so that the third transistor N2 is turned off. While the gate electrode of the third transistor N2 is floated, even when external light is irradiated onto the channel of the third transistor N2, no or little leakage current is generated at the channel. Accordingly, no or little voltage is supplied to the output terminal of the source drive IC through the third transistor N2 right after the image update.

The control logic circuit 50 compares the positive voltage Vpos, the negative voltage Vneg, and the logic power voltage Vcc and determines whether the present operation status is subjected to image update or image maintenance based on a comparison result. The control logic circuit 50 turns on the first to third switches SW1, SW2, and SW3 during the course of the image update. On the contrary, the control logic circuit 50 detects a variation in the positive voltage Vpos or logic power voltage Vcc immediately after the image update to turn off the first to third switches SW1, SW2, and SW3.

Figure 6:
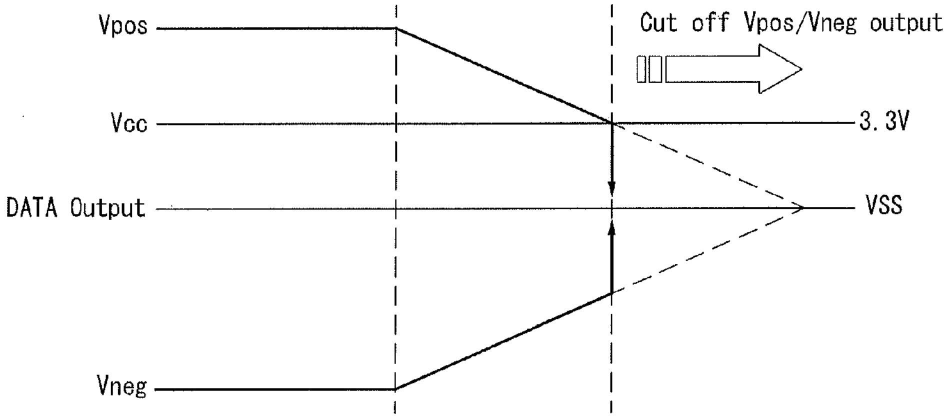
FIG. 6 is a waveform diagram illustrating an exemplary power off sequence.

During the image update, the positive voltage Vpos maintains +15V, and the negative voltage Vneg maintains −15V. During the image update, the logic power voltage Vcc maintains 3.3V. Immediately after the image update, according to a power off sequence preset in the power circuit 20, the positive and negative voltages Vpos and Vneg are turned off. Power off sequences right after the image update may be set by various methods. For instance, as shown in FIG. 6, immediately after the image update, the power circuit 20 cuts off (or turns off) output of the voltages Vpos and Vneg so that the voltages Vpos and Vneg approach OV and keeps the logic power voltage Vcc as 3.3V. According to an embodiment, as a power sequence method, as shown in FIG. 7, immediately after the image update, the power circuit 20 cuts off output of the voltages Vpos, Vneg, and Vcc so that the voltages Vpos, Vneg, and Vcc are astringent to OV.

In the power off sequence as shown in FIG. 6, the logic power voltage Vcc maintains 3.3V even after the image update whereas the positive and negative voltages Vpos and Vneg are turned off immediately after the image update. Under this situation, the control logic circuit 50 compares the logic power voltage Vcc with the positive voltage Vpos and when the positive voltage Vpos is lowered to less than the logic power voltage Vcc, turns off the first to third switches SW1, SW2, and SW3 to cut off the driving voltages Vpos, Vneg, and Vss of the source drive IC.

In the power off sequence as shown in FIG. 7, the positive voltage Vpos, negative voltage Vneg, and logic power voltage Vcc are discharged at substantially the same time point, thereby approaching 0V. In this course, since the logic power voltage Vcc is lower than the positive voltage Vpos, the logic power voltage Vcc arrives at 0V more rapidly than the positive voltage Vpos. In this case, when the logic power voltage Vcc is lowered to less than a preset internal voltage Vint, the control logic circuit 50 turns off the switches SW1, SW2, and SW3 to cut off the driving voltages Vpos, Vneg, and Vss of the source drive IC.

Referring to FIG. 5, the internal voltage generating circuit is configured as a voltage divider including first and second resistors R1 and R2. The first and second resistors R1 and R2 divide the positive voltage Vpos by a resistance ratio to generate the internal voltage Vint. The internal voltage is higher than 0V and lower than the logic power voltage Vcc—for example, the internal voltage is 1.2V.

FIG. 8 is a circuit diagram illustrating in detail the control logic circuit 50 shown in FIG. 5. FIG. 9 is a view illustrating a power off operation of the control logic circuit 50 shown in FIG. 5.

Referring to FIGS. 8 and 9, the control logic circuit 50 includes first and second comparators 81 and 82 and an OR gate.

The first comparator 81 compares the positive voltage Vpos and logic power voltage Vcc with each other, and when a comparison result indicates the positive voltage Vpos is higher than the logic power voltage Vcc, generates an output of a first logic value. In contrast, when the positive voltage Vpos is turned off so that the positive voltage Vpos is lowered to less than the logic power voltage Vcc after image update, the first comparator 81 generates an output of a second logic value.

The second comparator 82 compares the logic power voltage Vcc and internal voltage Vint with each other, and when a comparison result indicates the logic power voltage Vcc is higher than the internal voltage Vint, generates an output of the first logic value. In contrast, when the logic power voltage Vcc is turned off to be lowered to less than the internal voltage Vint after the image update, the second comparator 82 generates an output of the second logic value The OR gate performs an OR operation on the outputs of the first comparator 81 and the second comparator 82 and supplies a result to the control terminals of the switches SW1, SW2, and SW3 as a switch control signal.

The first logic value is High, e.g., '1', and the second logic value is Low, e.g., '0'. The switches SW1, SW2, and SW3 are turned on when a logic value of a switch control signal output from the control logic circuit 50 is the first logic value and are turned off in response to a switch control signal of the second logic value.

The control logic circuit 50 turns off the switches SW1, SW2, and SW3 when the positive voltage Vpos is lowered to less than the logic power voltage Vcc immediately after the image update as shown in FIG. 9 to cut off the voltage output from the source drive IC. The control logic circuit 50 and internal voltage generating circuit are embedded in the controller 11 or provided in a separate module.

Figure 10:
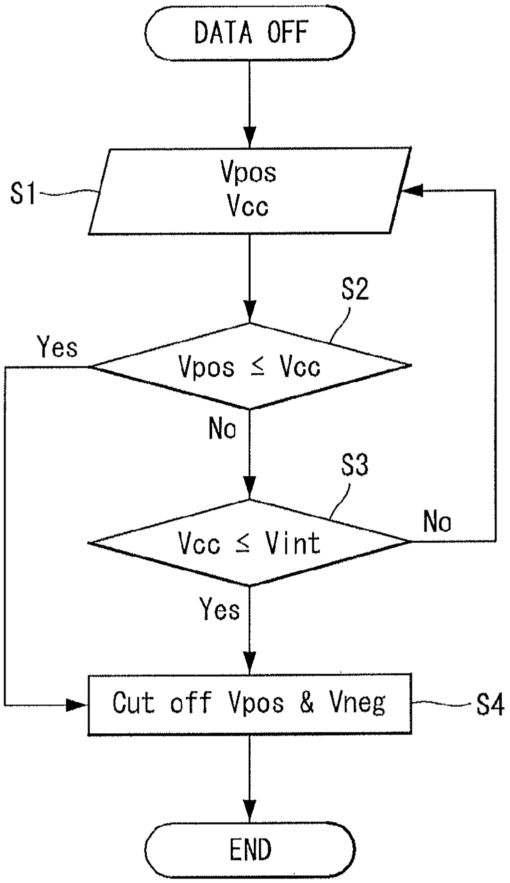
FIG. 10 is a flowchart sequentially illustrating a power control method according to an embodiment.

FIG. 10 is a flowchart sequentially illustrating a power control method according to an embodiment.

Referring to FIG. 10, according to an embodiment, the power control method compares the positive voltage Vpos with the logic power voltage Vcc and when a comparison result indicates the positive voltage Vpos is lowered to less than the logic power voltage Vcc, coercively cuts off the output of the source drive IC (S1, S2, and S4).

According to an embodiment, the power control method compares the logic power voltage Vcc with the internal voltage Vint and when a comparison result indicates the logic power voltage Vcc is lowered to less than the internal voltage Vint, coercively cuts off the output of the source drive IC (S1, S3, and S4).

Figure 11:
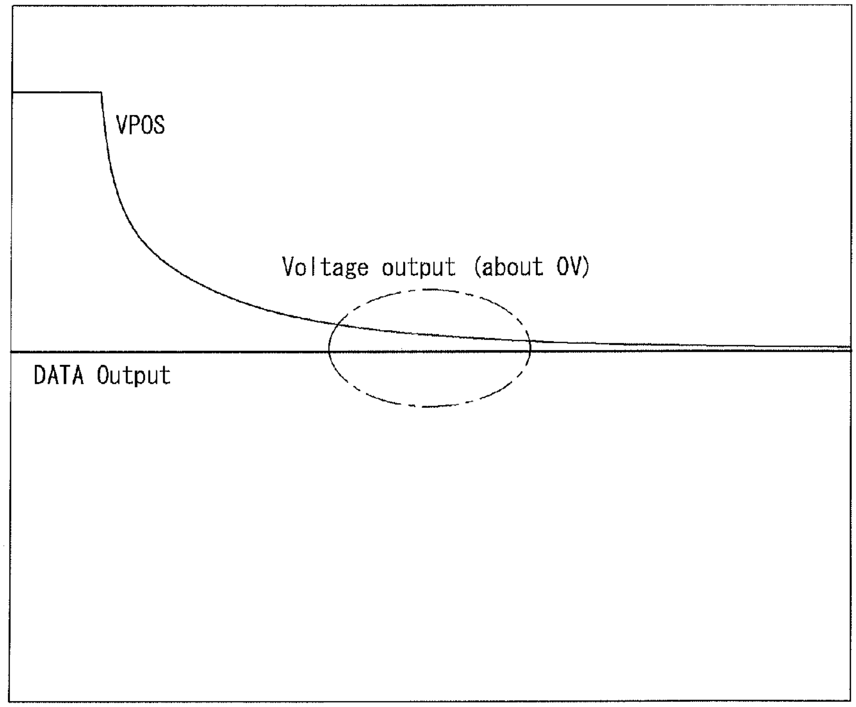
FIG. 11 is a view illustrating an experimental result obtained by irradiating a source drive IC with external light immediately after image update and measuring an output of the source drive IC according to an embodiment.

FIG. 11 illustrates an experimental result obtained by irradiating a source drive IC with external light immediately after image update and measuring an output of the source drive IC according to an embodiment. By using such a method, the embodiments cut off a current path between gate electrodes of transistors and level shifters embedded in the source drive IC immediately after the image update. As a result, the embodiments can prevent the source drive IC from creating abnormal output even when the level shifters generate output and external light is incident onto the transistors right after the image update.

Figure 12:
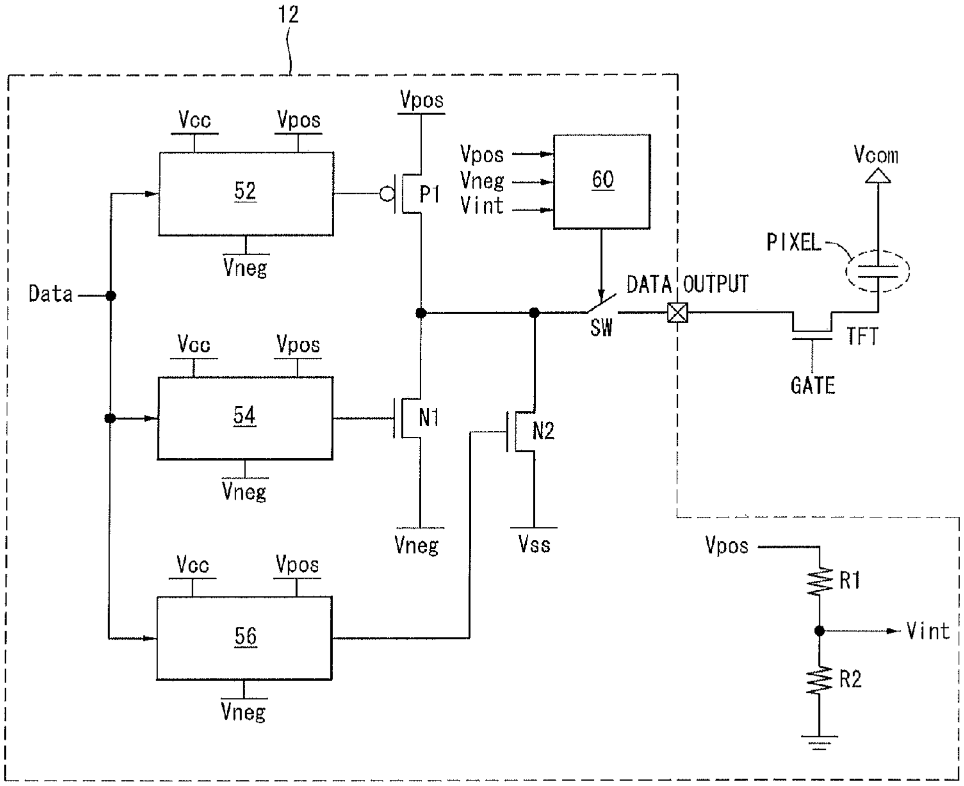
FIG. 12 is a circuit diagram illustrating a source drive IC according to an embodiment.

FIG. 12 is a circuit diagram illustrating a source drive IC according to an embodiment.

Referring to FIG. 12, the source drive IC of the data driving circuit 12 includes first to third level shifters 52, 54, and 56, first to third transistors P1, N1, and N2, a switch SW, a control logic circuit 60, and an internal voltage generating circuit.

According to an embodiment, the elements other than the switch SW and the control logic circuit 60 are the same or substantially the same as in the above embodiment. The switch SW turns on/off the current path connected to the output terminal of the source drive IC. Accordingly, in this embodiment, no switch exists between the level shifters 52, 54, and 56 and the transistors P1, N1, and N2.

The construction and operation of the control logic circuit 60 are the same or substantially the same as those shown in FIGS. 8 to 10. The control logic circuit 60 compares the driving voltages of the source drive IC and opens the output terminal of the source drive IC immediately after the image update based on a comparison result. Accordingly, the source drive IC cannot generate any output even when output is created from the level shifters 52, 54, and 56 and external light is irradiated onto the transistors P1, N1, and N2.

As described above, the embodiments of this document cut off output of the data driving circuit based on one of the positive voltage and logic power voltage immediate after image update, thus preventing abnormal output of the source drive IC after the image update.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. An electrophoresis display apparatus comprising:

a display panel comprising data lines and gate lines crossing the data lines;

a data driving circuit generating data voltages selected among a positive voltage, a negative voltage, and a ground voltage during an image update period and supplying the data voltages to the data lines;

a gate driving circuit supplying gate pulses to the gate lines in synchronization with the data voltages during an image update period; and a control logic circuit blocking an output of the data driving circuit when the positive voltage is lowered to less than a logic power voltage or when the logic power voltage is lowered to less than a preset internal voltage immediately after the image update period, wherein the positive voltage and the logic power voltage are direct current (DC) voltages, and wherein the logic power voltage is lower than the positive voltage and higher than the ground voltage and wherein the ground voltage is lower than the logic power voltage and higher than the negative voltage.

2. The electrophoresis display apparatus of claim 1, wherein the data driving circuit comprises, a first level shifter outputting one of the positive and negative voltages in response to an input data;

a second level shifter outputting one of the positive and negative voltages in response to the input data;

a third level shifter outputting one of the positive and negative voltages in response to the input data;

a first transistor outputting the positive voltage to an output terminal of the data driving circuit in response to an output voltage of the first level shifter;

a second transistor outputting the negative voltage to the output terminal of the data driving circuit in response to an output voltage of the second level shifter;

a third transistor outputting the ground voltage to the output terminal of the data driving circuit in response to an output voltage of the third level shifter;

a first switch turning on/off a current path between an output terminal of the first level shifter and a gate electrode of the first transistor under control of the control logic circuit;

a second switch turning on/off a current path between an output terminal of the second level shifter and a gate electrode of the second transistor under control of the control logic circuit; and a third switch turning on/off a current path between an output terminal of the third level shifter and a gate electrode of the third transistor under control of the control logic circuit.

3. The electrophoresis display apparatus of claim 2, wherein the control logic circuit turns off the first, second and third switches when the positive voltage is lowered to less than the logic power voltage.

4. The electrophoresis display apparatus of claim 2, further comprising:

an internal voltage generating circuit dividing the positive voltage to generate an internal voltage lower than the logic power voltage and higher than the ground voltage, wherein the control logic circuit turns off the first, second and third switches when the logic power voltage is lowered to less than the internal voltage.

5. The electrophoresis display apparatus of claim 1, wherein the data driving circuit comprises, a first level shifter outputting one of the positive and negative voltages in response to input data;

a second level shifter outputting one of the positive and negative voltages in response to the input data;

a third level shifter outputting one of the positive and negative voltages in response to the input data;

a first transistor outputting the positive voltage to an output terminal of the data driving circuit in response to an output voltage of the first level shifter;

a second transistor outputting the negative voltage to the output terminal of the data driving circuit in response to an output voltage of the second level shifter;

a third transistor outputting the ground voltage to the output terminal of the data driving circuit in response to an output voltage of the third level shifter;

a first switch turning on/off a current path between an output terminal of the first level shifter and a gate electrode of the first transistor under control of the control logic circuit; and a switch turning on/off a current path between the transistors and the output terminal of the data driving circuit under control of the control logic circuit.

6. The electrophoresis display apparatus of claim 5, wherein the control logic circuit turns off the switch when the positive voltage is lowered to less than the logic power voltage.

7. The electrophoresis display apparatus of claim 5, further comprising:

an internal voltage generating circuit dividing the positive voltage to generate an internal voltage lower than the logic power voltage and higher than the ground voltage, wherein the control logic circuit turns off the switch when the logic power voltage is lowered to less than the internal voltage.

8. The electrophoresis display apparatus of claim 7, further comprising:

a controller supplying digital data to the data driving circuit and controlling operation timing of the data and gate driving circuits, wherein the control logic circuit and the internal voltage generating circuit are embedded in one of the data driving circuit and the controller.

9. A power control method for an electrophoresis display apparatus comprising a display panel comprising data lines and gate lines crossing the data lines, a data driving circuit generating data voltages selected among a positive voltage, a negative voltage, and a ground voltage during an image update period and supplying the data voltages to the data lines, and a gate driving circuit supplying gate pulses to the gate lines in synchronization with the data voltages during an image update period, the method comprising:

detecting a variation in one of the positive voltage and a logic power voltage immediately after the image update period; and blocking an output of the data driving circuit when the positive voltage is lowered to less than the logic power voltage or when the logic power voltage is lowered to less than a preset internal voltage, wherein the positive voltage and the logic power voltage are direct current (DC) voltages, and wherein the logic power voltage is lower than the positive voltage and higher than the ground voltage and wherein the ground voltage is lower than the logic power voltage and higher than the negative voltage.

10. The power control method of claim 9, wherein blocking the output of the data driving circuit is performed when the positive voltage is lowered to less than the logic power voltage.

11. The power control method of claim 9, further comprising:

generating an internal voltage lower than the logic power voltage and higher than the ground voltage, wherein blocking the output of the data driving circuit is performed when the logic power voltage is lowered to less than the internal voltage.

* * * * *